Feb. 21, 1933.　　J. W. WHITE　　1,898,108
BRAKE MECHANISM
Filed Feb. 1, 1927

Inventor
JOHN WILLIAM WHITE

By Clarence S. Walker.
HIS Attorney

Patented Feb. 21, 1933

1,898,108

UNITED STATES PATENT OFFICE

JOHN WILLIAM WHITE, OF BUFFALO, NEW YORK

BRAKE MECHANISM

Application filed February 1, 1927. Serial No. 165,195.

This invention relates to an improvement in a brake mechanism, and more particularly to a brake mechanism of the internal type.

Brake mechanism of that type comprises generally a drum, which is fixed to the wheel, a supporting plate which is rigidly secured to some stationary portion of the vehicle, and suitable mechanism carried by the support and enclosed within the brake drum, by means of which pressure can be applied to the inner surface of the drum to check or retard the rotation of the drum relative to the support.

The present invention is an improvement upon my prior Patent No. 1,461,715, differing therefrom in many details of construction and adjustment, as will be pointed out below.

The primary object of this invention is to provide a brake having the minimum amount of travel, and in which the brake shoes engage the maximum surface of the drum, the engagement of the shoes being the same, regardless of the direction of rotation of the drum.

A further object of this invention is to provide fluid actuated means for operating the brake shoes, which means include a cylinder mounted within the brake drum, and having pistons which directly contact with the brake levers by which the brake shoes are pivotally supported.

Other objects of this invention will appear from a consideration of the following specification, taken in connection with the drawing which forms a part thereof, and in which Figure 1 is a sectional view of a brake mechanism taken substantially on the line 1—1 of Figure 2. Figure 2 is a sectional view taken on the line 2—2 of Figure 1.

Figures 1, 2:
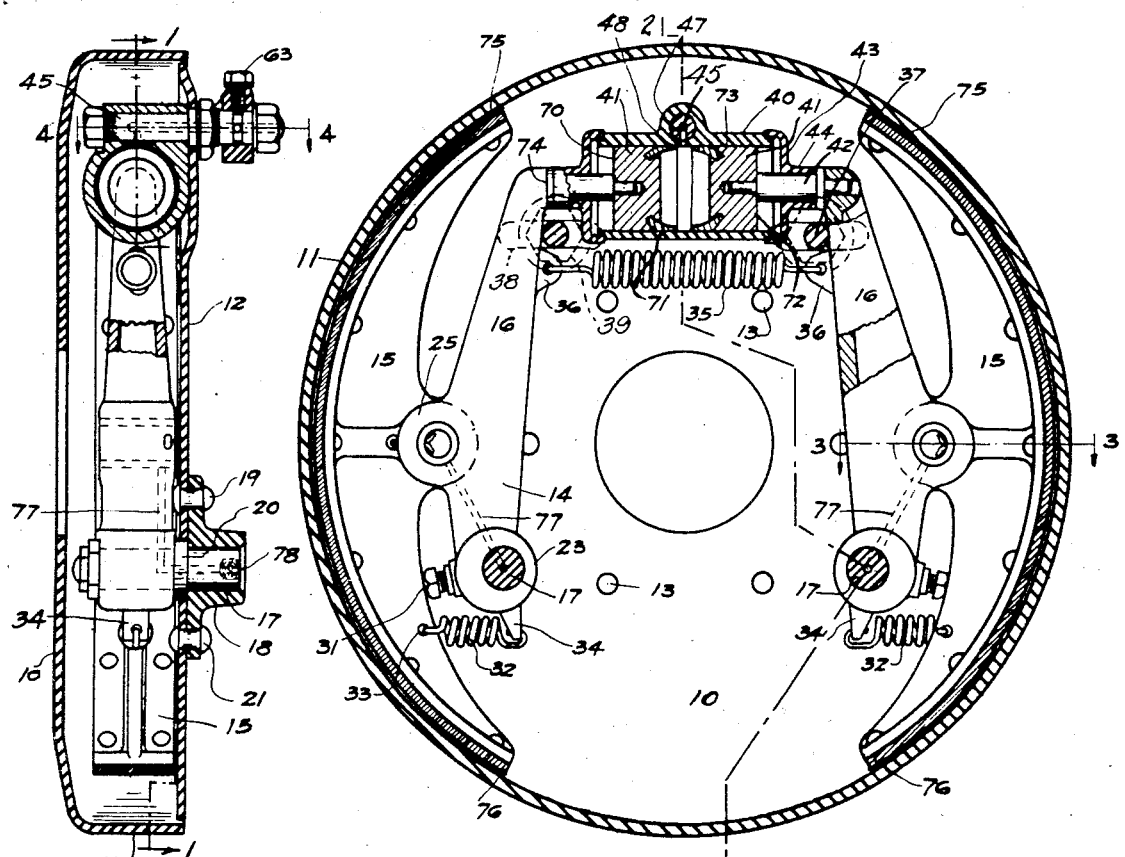

The mechanism embodying this invention includes a brake drum 10, secured to a wheel for rotation therewith, and having a peripheral flange 11, a support 12, suitably secured to a stationary portion of the vehicle by means of bolts (not shown) passed through holes 13 and braking mechanism, designated generally as 14. The braking mechanism comprises brake shoes 15, which are brought into contact when desired with the inner surface of the flange 11 of the brake drum 10, and brake levers 16, which are pivotally mounted upon posts 17, projecting inwardly from the supporting plate 12. In order to form a suitable base for each of the posts 17, a collar 18 is rigidly secured by rivets 19 to the outer face of the plate 12, in which collar the end of a post 17 is fixed. Each post 17 may include an integral ring 20, which rests in an opening 21 formed in the plate 12.

Figure 3:
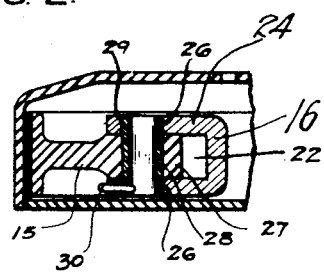
Fig. 3 is a sectional view taken along the line 3—3 of Figure 1.
Figure 5:
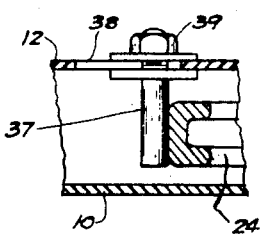
Fig. 5 is a detailed view, illustrating the manner of adjusting the location of the brake shoes with reference to the drum.
Figure 4:
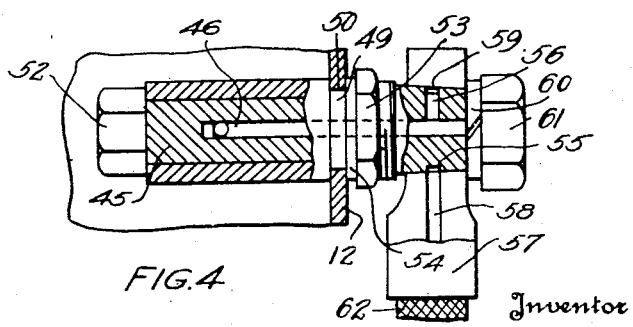
Fig. 4 is a sectional view taken along the line 4—4 of Figure 2.

The brake levers 16 carry the shoes 15 and are preferably formed, as shown particularly in Figures 3 and 5, of sheet material bent to provide channels 22, into which at a certain point the brake shoes 15 project. At its lower end where it engages the pin 17 the brake lever 16 is strengthened by providing a boss 23.

Intermediate its length each wall 24 of the lever 16 is provided with a circular projection 25 having a hole 26 therein. The inner edge of each brake shoe is also provided intermediate its length with an enlargement 27, having a hole 28 therethrough. Each shoe is mounted upon its lever by means of a tube 29, which extends through the holes 26 in the lever and the hole 28 in the shoe. A suitable cotter pin 30, extending through one of the walls 24 fixes the tube against rotation relative to the lever. The brake shoes 15, however, will turn freely on the tubes 29 between the walls 24 and in order to limit this movement of the shoe with reference to the lever a cap screw 31 adjustably mounted in the lever is provided. The head of the screw contacts with the inner edge of the shoe, and by turning the screw 31 in the lever 16, the desired limit of movement of the shoe with reference to the lever is obtained.

Each shoe 15 is held yieldably in contact with its screw 31 by a spring 32, which engages a hole 33 in the shoe 15, and a projection 34 from the lever 16. A spring 35 engaging ears 36 on the levers 16 functions to draw the levers toward one another, causing them to swing upon the pins 17, while studs 37 limit this approaching movement of the levers. These studs 37 are mounted in slots 38 in the supporting plate 12, and may be adjusted as desired in order to provide the most satisfactory operation of this mechanism, being fixed by means of nuts 39.

In accordance with the general practice in brakes of this type, means are provided for separating the levers 16 against the tension of the spring 35. In the present instance such means comprise a cylinder 40, rigidly mounted upon the supporting plate 12, and provided with a pair of oppositely moving pistons 41, mounted to reciprocate in the cylinder 40.

Each piston 41 includes a stud 42, a base 70 and a flexible ring 71. Each stud 42 has at its inner end a pin 72, which enters a pocket 73 in the base 70. The ends of the cylinder 40 are closed by caps 43, having integral sleeves 44, which function as guides for the studs 42. At the upper end of each lever 16 is mounted a button 74, which normally rests against the end of the sleeve 44, and against which bear the studs 42, when the pistons are forced apart.

The pistons 41 are caused to separate by fluid pressure in the center of the cylinder, which forces the pistons apart, and thus separates the levers against the tension of the springs 35. Fluid is introduced into the chamber by means of a centrally bored pin 45, having a central passage 46 connected by a conduit 47, with an opening 48 in the wall of the cylinder 40. The pin 45 includes a hexagonal portion 49, which rests in a suitably formed hole 50 in the supporting plate 12, thus insuring the coincidence of the conduit 47 and the opening 48.

The pin 45 is fixed in the cylinder 40 by means of a nut 52, and is secured to the plate 12 by means of a nut 53, bearing against a suitable washer 54. It will be noted that the pin 45 is thus not only fixed in the plate 12, but it also supports the cylinder 40 in the drum on the plate 12. Around the outer end of the pin 45 is formed an annular groove 55 connected to the passage 46 by means of a conduit 56. A cap 57 having a central passage 58 is mounted upon the end of the pin 45 with the passage 58 opening into the groove 55.

The surface of the pin 45, surrounded by the cap, is slightly coned and the aperture 59 in the cap is similarly formed to insure a close contact. A lock washer 60 and nut 61 on the end of the pin 45 secure the cap in place. The provision of the groove 55, of course, permits the engagement of the cap with the pin in any direction without affecting the connection of the passage 58 with the passage 46 through the groove 55 and conduit 56. Into the outer end of the cap 57 is fixed a flexible hose 62, by which the fluid in the cylinder 40 is connected to the braking system. A bleed valve 63 is provided on the cap 57, by which any air imprisoned in the cylinder or the parts associated with it can escape.

When pressure is transmitted through the hose 62 the passage 58, the groove 55, the conduit 56, the passage 46 and the conduit 47 to the cylinder 40, the pistons 41 are forced apart. The studs 42 are advanced out of the sleeves 44, and bearing against the buttons 74 swing the levers 16 on the posts 17, against the tension of the spring 35 and carry the brake shoes 15 against the flange 11. Since the brake shoes are carried on the levers intermediate the posts 17 and the buttons 74, the movement of the levers will cause the shoes to contact initially at the toes 75 and finally at the heels 76. This final contact results from the pivoting of the shoes on the toes 75 as fulcrums and the tensioning of the springs 32.

When the pressure is released the shoes will separate from the drum in reverse order, i. e., the heels 76 first being drawn back by the springs 32 and the toes 75 last.

Since the shoes are reversely located, this operation of the brake will be the same, regardless of the direction of rotation of the drums. The construction and operation thus described will insure the contact of the entire surface of the shoes with the drum.

The limiting studs 37 are adjusted as follows: The brake shoes 15 are first placed in the functioning position. The nuts 39 are loosened and the studs 37 slid along the slots 38 into contact with the levers 16. The studs 37 are then withdrawn the desired distance, as for example an eighth of an inch, and the nuts 39 are tightened, securing the studs in place. Since the nuts 39 are on the outside of the supporting plate 12 they are obviously accessible at all times and the adjustment can be made without dismounting or disassembling the brake.

In order to permit lubrication of the pivotally contacting surfaces at the posts 17 and tubes 29, conduits 77 are provided which pass through the posts 17 to the outer surfaces thereof, and thence, through the walls 24 of the levers 16, to the outer surfaces of the tubes 29. The conduits 77 terminate in pockets 78 in the posts 17, which pockets are internally threaded to permit the connection of a grease gun thereto. Like the adjustment just described the lubricating can be done from the outside of the brake drums.

The distance between the post 17 and the tube 29 is so much less than the distance between the post 17 and the button 74, that a small travel of the upper end of the lever will cause a considerable travel of the tube 29 and the brake shoe carried thereby. This removes the necessity of a fine adjustment of the levers and shoes.

It will be noted that the moving parts of the brake mechanism comprise, disregarding the springs 32 and 35, three units, to wit: two lever and brake shoe units, and a single unit consisting of the cylinder 40 and its associated elements, all of which are mounted upon the plate 12. Hence the assemblage of the brake is very easily and quickly performed. After the units have been mounted on the plate 12 the screws 31 are set to adjust the relation of the shoes to the levers and the springs 32 and 35 are placed. The final adjustment of the levers and shoes relative to the brake drum is made after the brake has been installed.

While one embodiment only of this invention has been shown and described, applicant is not limited thereto, since it is obvious that other embodiments can be made without departing from the spirit and scope of this invention as set forth in the following claims.

Having thus set forth my invention, what I claim as new and for which I desire protection by Letters Patent is:

1. In a brake mechanism including a brake drum, brake levers each pivotally mounted at one end upon a support, brake shoes carried by said levers, a spring engaging the free ends of the levers for holding the shoes normally out of contact with the drum, studs against which the free ends of the levers are held by said spring, said studs being mounted in slots in the support and accessible from outside the brake drums for adjustment in the slots.

2. In a brake mechanism including a hydraulic cylinder and a support therefor, a pin securing the cylinder to the support and having a passage therein through which fluid is conducted to said cylinder, the end of the pin outside the support including a tapered portion having an annular groove therein connected to the passage by a conduit and a fluid supply hose terminating in a cap provided with an aperture to receive the tapered portion of the pin and through which fluid is conducted from the hose to the groove, the conduit and the passage of the pin and thence to the cylinder.

3. In a brake mechanism, a brake drum having a backing plate, a plurality of brake shoes arranged within the drum for engagement therewith, means normally urging the shoes away from the drum, and means associated with each brake shoe for limiting movement of the latter by the means aforesaid and for independently adjusting each shoe, said means including stops slidably mounted within slots formed in the backing plate for movement relative to the shoes, and clamping means for securing the stops in their various adjusted positions accessible from a point exteriorly of the drum.

4. In a brake mechanism, a brake drum having a backing plate, a braking element located within the drum for engagement therewith, means normally urging the said element away from the drum, and means for limiting movement of the element by said means including a stop mounted for sliding movement in a slot formed in the backing plate, and clamping means for the stop positioned exteriorly of the drum so as to be readily accessible for actuation.

5. In a brake mechanism, a brake drum having a backing plate, a braking element located within the drum for engagement therewith, hydraulically operated means for actuating the element to engage the same with the drum, said means including a fluid cylinder located within the brake drum and having a transverse opening therethrough, means for securing the fluid cylinder within the drum including a bolt having a head portion engaging the inner side of the hydraulic cylinder and having a shank portion extending through the opening aforesaid therein and through an aligned opening in the backing plate for engaging a clamping nut, said bolt further having a passage therethrough communicating at the outer end with a source of fluid supply and at the inner end with the fluid cylinder.

In testimony whereof I have affixed my signature.

JOHN WILLIAM WHITE.